United States Patent
Akiyoshi et al.

(10) Patent No.: US 9,127,753 B2
(45) Date of Patent: Sep. 8, 2015

(54) SPEED REDUCER

(75) Inventors: Koji Akiyoshi, Iwata (JP); Koji Sato, Iwata (JP); Masafumi Nakakoji, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 14/345,964

(22) PCT Filed: Sep. 5, 2012

(86) PCT No.: PCT/JP2012/072575
§ 371 (c)(1),
(2), (4) Date: Apr. 7, 2014

(87) PCT Pub. No.: WO2013/042537
PCT Pub. Date: Mar. 28, 2013

(65) Prior Publication Data
US 2014/0228161 A1   Aug. 14, 2014

(30) Foreign Application Priority Data
Sep. 22, 2011 (JP) .................. 2011-207174

(51) Int. Cl.
*F16H 13/08* (2006.01)
*F16H 57/08* (2006.01)
*F16H 3/62* (2006.01)
(Continued)

(52) U.S. Cl.
CPC .................. *F16H 1/321* (2013.01); *F16H 1/32* (2013.01); *F16H 3/48* (2013.01); *F16H 3/62* (2013.01); *F16H 13/08* (2013.01)

(58) Field of Classification Search
USPC ................................. 475/196, 904
See application file for complete search history.

(56) References Cited

U.S. PATENT DOCUMENTS 4,736,654 A    4/1988   Ren
2009/0165274 A1  7/2009  Sensui et al.

FOREIGN PATENT DOCUMENTS

| JP | 61-294253 | 12/1986 |
| JP | 62-093565 | 4/1987 |
| JP | 62093565 A | * 4/1987 |

(Continued)

OTHER PUBLICATIONS

International Search Report issued Nov. 13, 2012 in International (PCT) Application No. PCT/JP2012/072575.
(Continued)

*Primary Examiner* — Ramya Burgess
*Assistant Examiner* — Timothy M Hannon
(74) *Attorney, Agent, or Firm* — Wenderoth, Lind & Ponack, L.L.P.

(57) ABSTRACT

A speed reducer includes an internal gear, an input shaft coaxial with the internal gear, and an eccentric disk on the input shaft and rotatable inside the internal gear. A cage, at an end of an output shaft, coaxial with the input shaft, and rotatable between the internal gear and the eccentric disk has pockets fewer in number than the internal gear's internal teeth. Rollers are received in the respective pockets such that when the input shaft rotates once, the rollers circumferentially move by a distance equal to one internal tooth width, causing the output shaft to be rotated at a reduced speed. The root radius of the internal gear, the radius of the circumcircle of the rolling bearing, and the outer diameter of the rollers are determined such that roller gaps defined between the rollers and the tooth bottoms of the internal gear are controlled to reduce vibration.

6 Claims, 5 Drawing Sheets

(51) Int. Cl.
  *F16H 3/48* (2006.01)
  *F16H 1/32* (2006.01)

(56) References Cited

FOREIGN PATENT DOCUMENTS

| JP | 2004-346977 | 12/2004 |
|---|---|---|
| JP | 2005-156499 | 6/2005 |
| JP | 2006-142446 | 6/2006 |
| JP | 2011-052765 | 3/2011 |
| JP | 2011-052769 | 3/2011 |
| JP | 2011-140982 | 7/2011 |

OTHER PUBLICATIONS

Japanese Office Action issued Jan. 13, 2015 in corresponding Japanese Patent Application No. 2011-207174 (with English translation).

* cited by examiner

SPEED REDUCER

TECHNICAL FIELD

This invention relates to a speed reducer of the type including rollers adapted to be brought into meshing engagement with the internal teeth of an internal gear one after another, of which the rollers are fewer in number than the internal teeth of the internal gear.

BACKGROUND ART

JP Patent Publication 62-93565A discloses one of such roller type speed reducers. The roller type speed reducer disclosed in JP Patent Publication 62-93565A includes an input shaft and an output shaft that are arranged coaxial with each other with their ends facing each other. A housing covers the opposed ends of the input and output shafts, and supports an internal gear having curved internal teeth on the inner periphery. Two eccentric disks are mounted, axially spaced apart from each other, on the end portion of the input shaft so as to be rotatable inside the internal gear. A cage is provided at the end of the output shaft facing the input shaft so as to be disposed between the internal gear and rolling bearings press-fitted on the radially outer surfaces of the respective eccentric disks. Pockets are formed in two rows in the cage such that the pockets in each row are circumferentially equidistantly spaced apart from each other and radially face one of the eccentric disks. The pockets in each row are fewer in number than the internal teeth. Rollers are received in the respective pockets so as to engage the internal teeth of the internal gear one after another while rolling along the radially outer surfaces of the rolling bearings.

In this arrangement, when the input shaft of the speed reducer rotates once, each of the rollers circumferentially moves by a distance equal to the circumferential width of one internal tooth while kept in meshing engagement with the internal tooth, due to rotation of the eccentric disks, causing the output shaft to be rotated at a reduced speed.

In order to smoothly transmit rotation, JP Patent Publication 62-93565A proposes to determine the profile of each internal tooth of the internal gear of the speed reducer so as to coincide with the curve outside of any one roller that is parallel to the trajectory of the center of the roller, when the output shaft is rotated a distance equal to one pitch of the teeth of the internal gear by the rotation of the eccentric disks, whereby all of the rollers contact internal teeth.

Component parts forming the above-described roller type speed reducer, such as the internal gear, eccentric disks, rolling bearings and rollers, have manufacturing errors. Conventional speed reducers are manufactured by simply assembling together these component parts, which have manufacturing errors, so that roller gaps tend to vary from one speed reducer to another, and thus their qualities also tend to vary.

One of the roller gaps is shown at 20 in FIG. 5, which shows a roller reduction mechanism of a roller type speed reducer. As shown in FIG. 5, the roller gaps 20 are defined between rollers 19 arranged on the side of a rolling bearing 11 fitted on the outer periphery of an eccentric disk where the eccentric disk is displaced and tooth bottoms 4*a* of internal teeth 4 formed on the inner periphery of an internal gear 3.

Since conventional speed reducers are assembled without controlling the roller gaps 20, it is difficult to set the size of the roller gaps 20 within an optimum range. Thus, the roller gaps 20 may be too large in some speed reducers. If the roller gaps 20 are too large, when a roller 19 disengages from one internal tooth 4 of the internal gear and then engages an adjacent internal tooth 4, the roller 19 tends to collide against the tooth bottom 4*a* of the internal tooth 4, thus producing vibration.

The size $\delta_1$ of the roller gaps 20 are given by:

$$\delta_1 = (A-B)-C \qquad \text{Formula (1)}$$

where
A is the root radius of the internal gear 3;
B is the radius of the circumcircle of the rolling bearing 11, of which the center lies on the center axis of the input shaft; and
C is the outer diameter of the rollers 19.

The present inventors examined influences of the roller gaps 20, which are defined between the rollers 19 and the tooth bottoms 4*a* of the internal gear 3, on the speed reducer, and discovered the following:

Efficiency: If some roller gaps are too large and other gaps are too small, the speed reducer cannot rotate at a constant speed. Also, torque loss is large where roller gaps are small, which reduces efficiency.

Life: Excessive surface pressures are generated between the contact portions of a roller and the radially inner surface of the internal gear or between the roller and the outer race of the rolling bearing when the roller passes through an excessively small roller gap, which could result in premature peeling.

Vibration: Behaviors of the rollers become unstable when they pass through excessively small roller gaps, producing vibration.

FIG. 6 shows the results of characteristic evaluation of the roller gaps 20 in terms of input characteristic values. FIG. 6 clearly indicates that it is important that the roller gaps 20 be within an optimum range.

SUMMARY OF THE INVENTION

An object of the present invention is to reduce vibration of a speed reducer and stabilize the quality of the speed reducer, by setting the roller gaps within an optimum range.

In order to achieve this object, the present invention provides a speed reducer comprising a fixed internal gear formed with internal teeth on an inner periphery of the internal gear, an input shaft, at least one eccentric disk mounted on the input shaft at an end portion of the input shaft so as to be rotatable inside the internal gear, at least one rolling bearing mounted on a radially outer surface of the eccentric disk, an output shaft arranged coaxial with the input shaft, a cage mounted at an end of the output shaft facing the input shaft so as to be rotatable between the internal gear and the rolling bearing, wherein the cage has a portion radially facing the rolling bearing and formed with circumferentially equidistantly spaced apart pockets which are fewer in number than the internal teeth of the internal gear, and rollers received in the respective pockets so as to mesh with the internal teeth, whereby when the input shaft is rotated once, each of the rollers circumferentially moves by a distance equal to a circumferential width of one internal tooth while kept in meshing engagement with the tooth, due to eccentric rotation of the eccentric disk, causing the output shaft to be rotated at a reduced speed, wherein roller gaps defined between the rollers and tooth bottoms of the internal gear are adjusted within a range of 0 to 20 μm by measuring beforehand a root radius of the internal gear, a radius of a circumcircle of the rolling bearing, the circumcircle having a center lying on a center axis of the input shaft, and an outer diameter of the rollers.

The roller gaps refer to the gaps one of which is shown in FIG. 5 at 20. By setting the roller gaps within the range of 0 to 20 μm, as is apparent from the test results of various characteristics shown in FIG. 6, it is possible to reduce vibration of the speed reducer and stabilize the quality of the speed reducer.

The speed reducer according to the present invention may include two of the above-mentioned eccentric disks that are axially spaced apart from each other and having respective centers circumferentially offset by 180° from each other, wherein revolving diameters of the radially outer surfaces of the rolling bearings fitted on the respective eccentric disks are measured simultaneously.

The root radius of the internal gear can be measured with high accuracy by using a laser displacement meter or a faradmeter.

According to the speed reducer of the present invention, since the roller gaps defined between the rollers and tooth bottoms of the internal gear are adjusted within a range of 0 to 20 μm by measuring beforehand the root radius of the internal gear, the radius of the circumcircle of the rolling bearing, the circumcircle having a center lying on a center axis of the input shaft, and the outer diameter of the rollers, it is possible to reduce vibration of the speed reducer and stabilize the quality of the speed reducer.

DETAILED DESCRIPTION OF THE INVENTION

Figure 1:
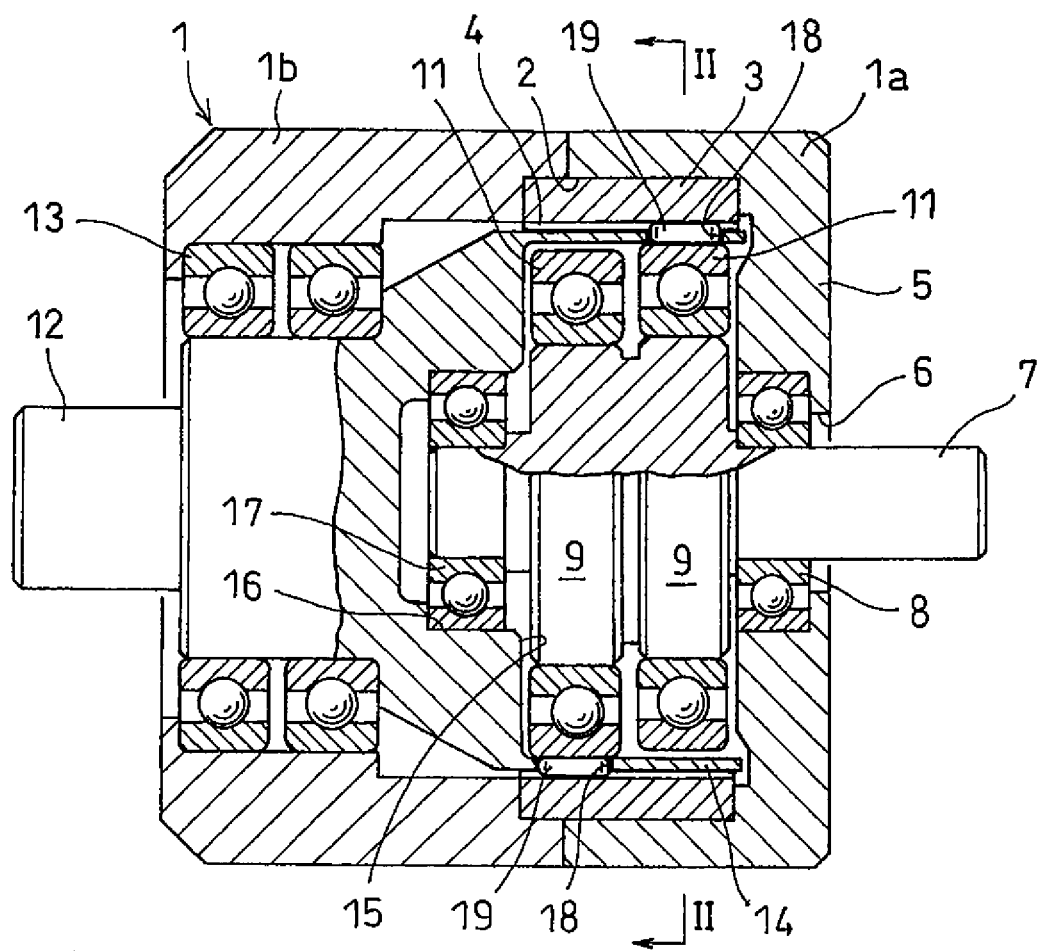
FIG. 1 is a vertical sectional front view of a speed reducer embodying the present invention.

Referring now to the drawings, the speed reducer embodying the present invention includes a cylindrical housing 1 (FIG. 1). The housing 1 is axially split into first and second split housing portions 1a and 1b.

The first and second split housing portions 1a and 1b are joined together by tightening bolts (not shown). A largediameter recess 2 is formed in the radially inner surfaces of the first and second split housing portions 1a and 1b near the abutment ends thereof to extend across the abutment ends.

Figure 2:
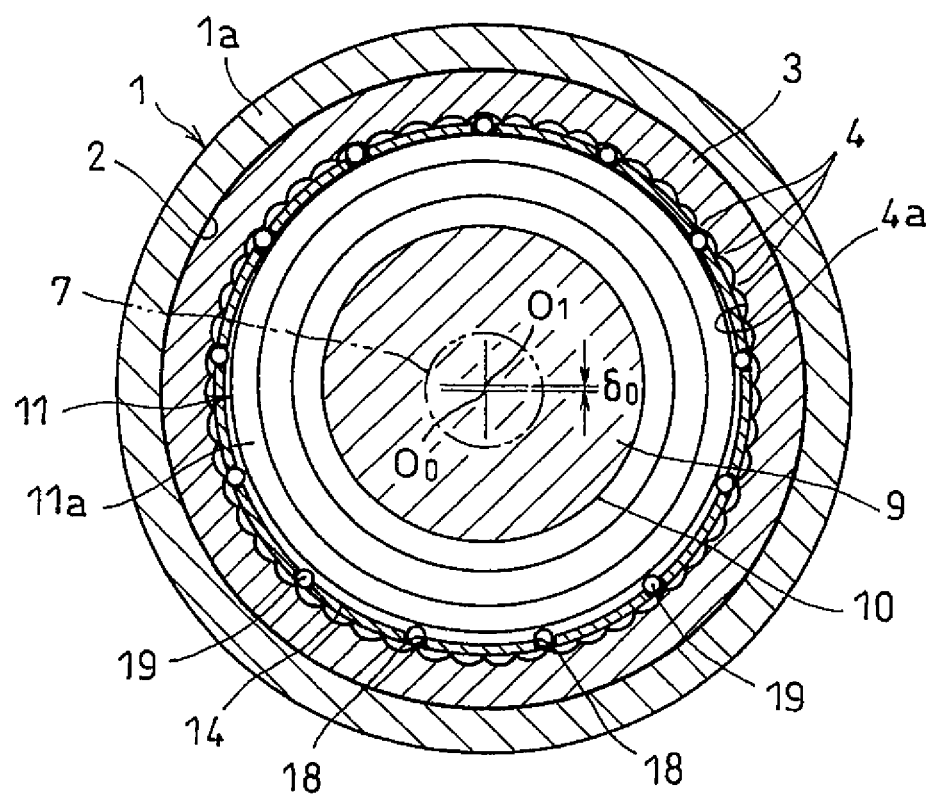
FIG. 2 is a sectional view taken along line II-II of FIG. 1.

As shown in FIGS. 1 and 2, an internal gear 3 having a plurality of teeth 4 on the inner periphery thereof is pressfitted in the large-diameter recess 2.

As shown in FIG. 1, the first split housing portion 1a has an end wall 5 closing one end of the housing portion 1a. An input shaft 7 extends through a shaft inserting hole 6 formed in the center of the end wall 5. The input shaft 7 is rotatably supported by a bearing 8 mounted in the shaft inserting hole 6 so as to be coaxial with the internal gear 3. Two eccentric disks 9 are mounted on the input shaft 7 at its end portion located in the housing 1 so as to be axially spaced apart from each other and so as to be rotatable inside the internal gear 3.

The two eccentric disks 9 are arranged such that the centers of the cylindrical radially outer surfaces 10 of the respective eccentric disks 9 are circumferentially offset from each other by 180°. Rolling bearings 11 are press-fitted on the radially outer surfaces 10 of the eccentric disks. The rolling bearings 11 are ball bearings in the embodiment. In FIG. 2, the symbol $\delta_0$ indicates the offset distance between the center $O_0$ of the input shaft and each of the centers $O_1$ of the cylindrical radially outer surfaces of the respective eccentric disks 9.

As shown in FIG. 1, an output shaft 12 is inserted in the second split housing portion 1b. The output shaft 12 is rotatably supported by a bearing 13 mounted in the open end of the second split housing portion 1b so as to be coaxial with the input shaft 7.

The output shaft 12 carries a cage 14 at its end facing the input shaft 7. The cage 14 is rotatable between the opposed portions of the rolling bearings 11 mounted on the eccentric disks 9 and the internal gear 3. The cage 14 has a closed end having an end surface 15 near the output shaft 12. A smalldiameter hole 16 is formed in the end surface 15 at its central portion in which a bearing 17 is mounted which supports the end of the input shaft 7.

As shown in FIGS. 1 and 2, pockets 18 are formed in two rows in the cage 14 such that the pockets 18 in each row are circumferentially equidistantly spaced apart from each other and radially face one of the rolling bearings 11 supported on the respective eccentric disks 9 and such that the pockets 18 in one row are circumferentially offset by half the pitch from the corresponding pockets 18 in the other row.

The pockets 18 in each row are fewer in number than the internal teeth 4 formed on the inner periphery of the internal gear 3. A roller 19 is radially movably received in each pocket 18.

The rollers 19 are engageable with the internal teeth 4 of the internal gear 3. Each tooth 4 has such a curved profile that all of the rollers 19 arranged in the circumferential direction can simultaneously contact corresponding ones of the internal teeth 4. For this purpose, the profile of each internal tooth 4 is determined, as disclosed in JP Patent Publication 62-93565A, so as to coincide with the curve outside of any one roller 19 that is parallel to the trajectory of the center of the roller 19, when the output shaft 12 is rotated a distance equal to one pitch of the teeth 4 of the internal gear 3 by the rotation of the eccentric disks 9.

Figure 5:
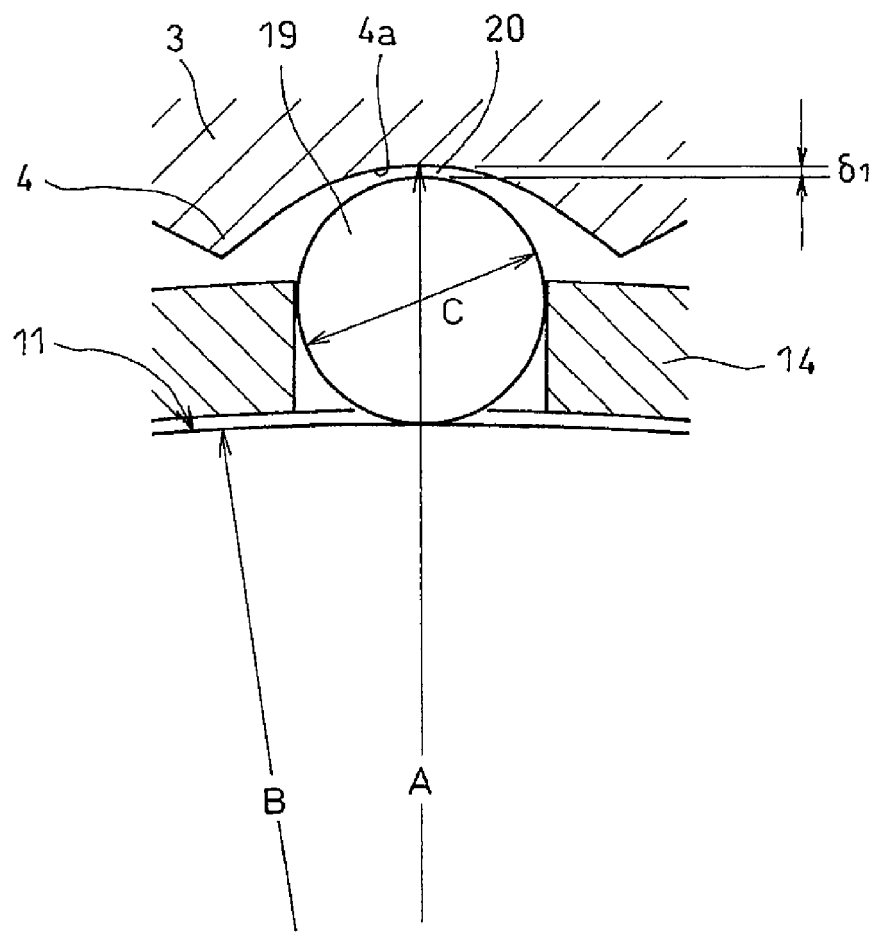
FIG. 5 is a sectional view showing the root radius of an internal gear, the radius of the circumcircle of a rolling bearing, whose center lies on the center axis of the input shaft, and the outer diameter of a roller.
Figure 6:
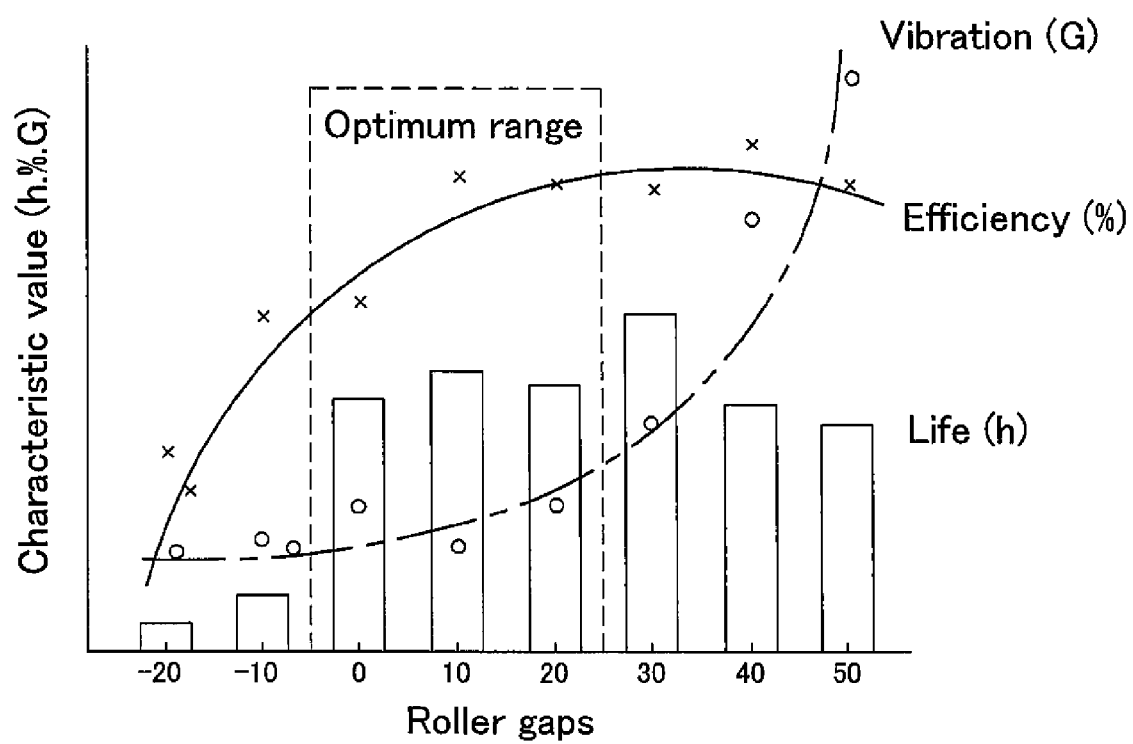
FIG. 6 is a graph showing roller gaps and the results of evaluation of various characteristics.

In assembling the speed reducer of this embodiment, as the internal gear 3, rolling bearings 11 and rollers 19, suitable ones are selected such that the size 61 of the roller gaps 20 between the rollers 19 and corresponding tooth bottoms of the internal gear 3 is within the range of 0 to 20 μm, by measuring the root radius A of the internal gear 3, the radius B of the circumcircle of the outer races 11a of the rolling bearings 11, whose center lies on the axis of the input shaft, and the outer diameter C of the rollers 19, which are shown in FIG. 5.

In measuring the radius B of the circumcircle of the outer races 11a of the rolling bearings 11, whose center lies on the axis of the input shaft 7, an outer race for a gauge (not shown) which is equal in diameter to the rolling bearings 11 and which has a completely circular radially outer surface is prepared, and a probe 31 of a dial gauge 30 is pressed against the radially outer surface of the outer race for a gauge and the position of the pointer at this time is recorded.

Figure 3:
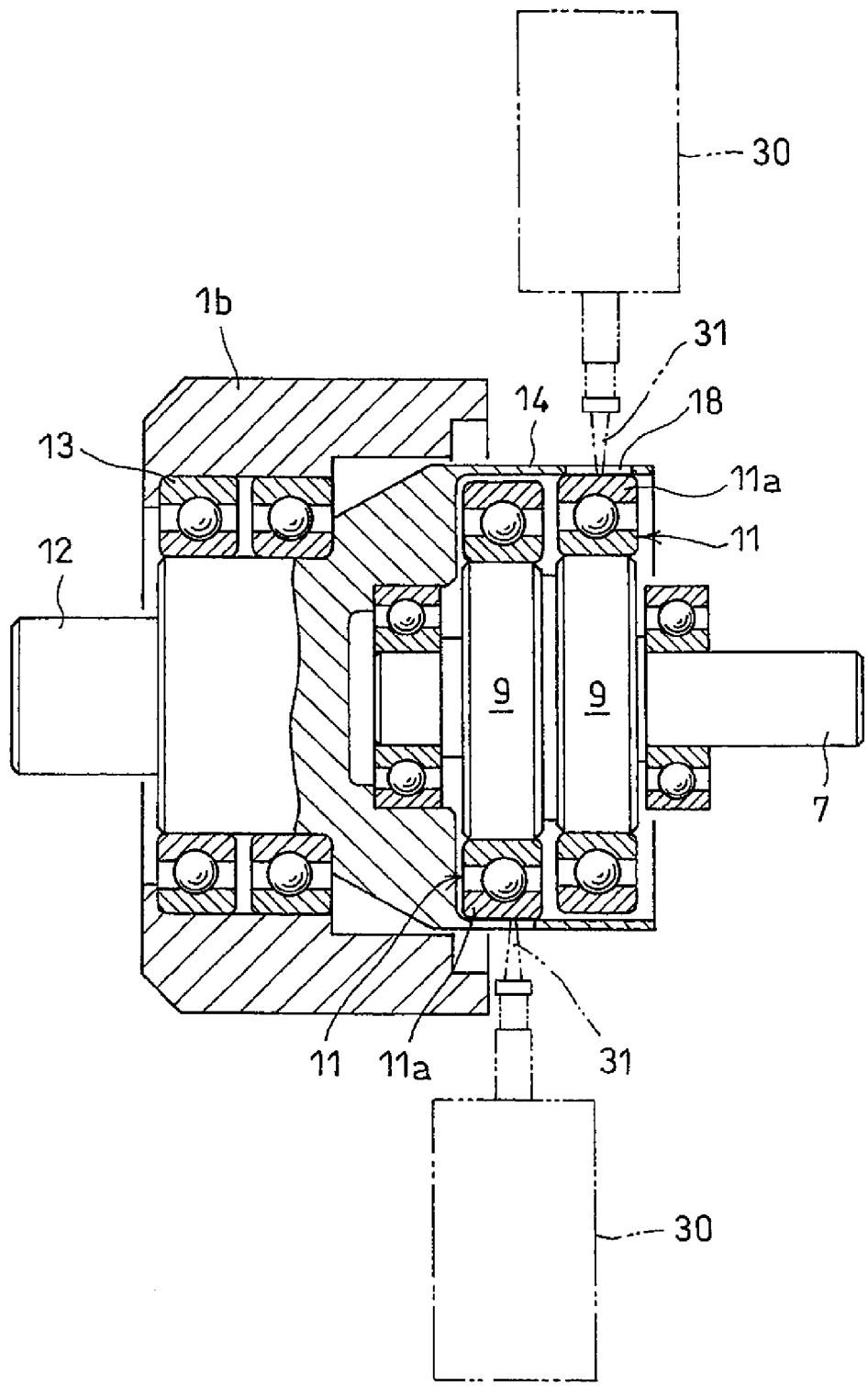
FIG. 3 is a sectional view of the speed reducer, showing how the radii of the circumcircles of rolling bearings, whose centers lie on the center axis of an input shaft, are measured.

Then, as shown in FIG. 3, with the first split housing portion 1a and the internal gear 3 removed, the probe 31 of the dial gauge 30 is inserted into one of the pockets 18 until the probe 31 is pressed against the radially outer surface of the outer race 11a of one of the rolling bearings 11. Then with the pointer set in the recorded position, the input shaft 7 is rotated once.

Figure 4:
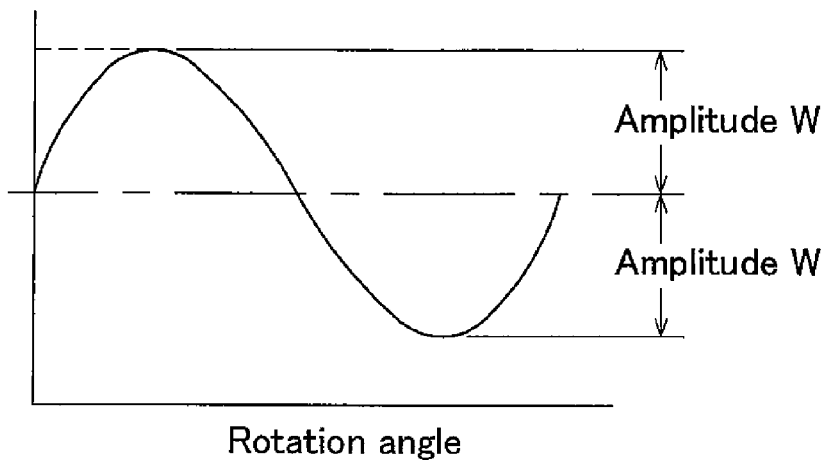
FIG. 4 is a graph showing the results of measurement of the radii of the circumcircles of the rolling bearings.

As shown in the graph of FIG. 4, when the input shaft 7 is rotated, the pointer of the dial gauge 30 detects a value twice the offset distance δ of the eccentric disks 9 (i.e. 2δ) in the form of a sine curve. The radius B of the circumcircle of the outer race 11a of the rolling bearing 11 is therefore given as the sum of the amplitude W of the sine curve and the radius of the outer race for a gauge.

Thus, it is possible to easily measure the radius B with high accuracy by directly measuring the radially outer surfaces of the outer races 11a of the rolling bearings 11, without the need to measure the outer diameters of the eccentric disks 9, the inner diameters of the inner races of the rolling bearings 11, or the concentricity. Further, since this measurement can be made in an assembly line of speed reducers, no substantial change in the assembly line is necessary.

The root radius of the internal gear is measured using a laser displacement meter or a faradmeter.

In assembling the speed reducer of FIG. 1, as the internal gear, rolling bearings and rollers, suitable ones are selected regarding their dimensions A, B and C. When the input shaft 7 of this speed reducer is rotated once, each roller 19, which is in meshing engagement with one of the internal teeth 4 of the internal gear 3, circumferentially moves by a distance equal to a circumferential width of one internal tooth 4 while kept in meshing engagement with the internal tooth, due to rotation of the eccentric disks 9, so that the output shaft 12 rotates at a reduced speed.

In this embodiment, since the size $\delta_1$ of the roller gaps 20 between the rollers 19 and corresponding tooth bottoms of the internal gear 3 is set within the range of 0 to 20 μm, the rollers 10 never collide against the internal gear 3, and thus produce no vibration.

Uneven rotation due to roller gaps 20 being partly too large and partly too small is also prevented. Torque loss, which reduces efficiency, at portions where rollers gaps are too small is also prevented.

If rollers gaps are partly too small, when the rollers 19 pass through these too small gaps, excessive surface pressure is generated between the contact portions of the rollers 19 and the radially inner surface of the internal gear or between the contact portions of the rollers 19 and the outer races 11a of the rolling bearings 11, which could result in premature flaking. But this is prevented by setting the size $\delta_1$ of the roller gaps 20 within the range of 0 to 20 μm.

What is claimed is:

1. A method of assembling a speed reducer comprising a fixed internal gear formed with internal teeth on an inner periphery of the internal gear, an input shaft, at least one eccentric disk mounted on the input shaft at an end portion of the input shaft so as to be rotatable inside the internal gear, at least one rolling bearing mounted on a radially outer surface of the eccentric disk, an output shaft arranged coaxial with the input shaft, a cage mounted at an end of the output shaft facing the input shaft so as to be rotatable between the internal gear and the rolling bearing, wherein the cage has a portion radially facing the rolling bearing and formed with circumferentially equidistantly spaced apart pockets which are fewer in number than the internal teeth of the internal gear, and rollers received in the respective pockets so as to mesh with the internal teeth, whereby when the input shaft is rotated once, each of the rollers circumferentially moves by a distance equal to a circumferential width of one tooth while kept in meshing engagement with the tooth, due to eccentric rotation of the eccentric disk, causing the output shaft to be rotated at a reduced speed, the method comprising:
selecting the internal gear, the rolling bearing, and the rollers based on advance measurements of a root radius of the internal gear, a radius of a circumcircle of the rolling bearing, the circumcircle having a center lying on a center axis of the input shaft, and an outer diameter of the rollers, wherein the root radius of the internal gear, the radius of the circumcircle and the outer diameter of the rollers are determined such that roller gaps defined between the rollers and tooth bottoms of the internal gear when the speed reducer is assembled are within a range of 0 to 20 μm; and
assembling the speed reducer.

2. The method of claim 1, wherein the at least one eccentric disk comprises two eccentric disks axially spaced apart from each other and having respective centers circumferentially offset by 180° from each other, wherein the at least one rolling bearing comprises two rolling bearings fitted on the respective eccentric disks, and wherein revolving diameters of radially outer surfaces of the respective rolling bearings are measured simultaneously.

3. The method of claim 2, wherein the root radius of the internal gear is measured using a laser displacement meter.

4. The method of claim 2, wherein the root radius of the internal gear is measured using a faradmeter.

5. The method of claim 1, wherein the root radius of the internal gear is measured using a laser displacement meter.

6. The method of claim 1, wherein the root radius of the internal gear is measured using a faradmeter.

* * * * *